3,459,842
METHOD OF PREPARING A SILICON CARBIDE WHISKER REINFORCED SILICON COMPOSITE MATERIAL
Gene F. Wakefield, Richardson, Tex., assignor to Texas Instruments Incorporated, Dallas, Tex., a corporation of Delaware
No Drawing. Filed Dec. 18, 1967, Ser. No. 691,202
Int. Cl. C04b 35/64
U.S. Cl. 264—56       4 Claims

ABSTRACT OF THE DISCLOSURE

A method of preparing a composite material consisting of a silicon matrix having embedded therein silicon carbide whiskers by admixing particulate silicon with silicon carbide whiskers, placing the mixture in a quartz mold and elevating the temperature of the silicon and silicon carbide mixture to a temperature slightly above the melting point of silicon followed by cooling of the silicon and silicon carbide mixture. The method may include the step of using an elongated quartz vessel as the mold to permit drawing of the elongated quartz vessel after elevating the temperature of the quartz vessel to a temperature slightly below the melting point of the quartz to thereby produce an elongated or filamentary shaped silicon and silicon carbide composite material.

---

This invention relates to a composite material and its method of manufacture, and more particularly, but not by way of limitation, to a silicon and silicon carbide composite material and a method of preparing such material.

A composite material can be generally defined as a material combined of two or more phases wherein the combined material has properties greater than obtainable in monolithic structure. Many composites are designed from an "auf bau" principle, i.e., that materials having the particularly desired properties are combined with other materials adding other desired properties or fulfilling the negative or disadvantageous aspects of the other constituents. One type of such materials are those having a matrix reinforced with a fiber or whisker. Composite materials of the last mentioned type have been demonstrated to possess greater strength than the basic material or matrix within which the fibers are embedded. As is explained in Kelly and Davies, The Principles of the Fiber Reinforcement of Metals, 10, Metallurgical Review 37, 1965, composite materials which have as the reinforcing element either fibers or whiskers have been fabricated for various application. Examples of fiber reinforced materials which have found commercial acceptance are steel reinforced concrete, nylon and rayon reinforced tires, and Fiberglas reinforced plastics. Efforts have also been directed to the fabrication of fiber reinforced metals such as steel wire and boron fiber reinforced aluminum.

Whiskers may be generally defined as single crystal filaments of high crystalline perfection having a length from 100 to 1000 times greater than their diameter. Usually they are much smaller in size, 1 to 10 microns in diameter, than fibers, which are usually 25 to 300 microns in diameter. The whisker materials are characterized by the fact that their strengths are nearer to the theoretical strengths expected of materials, approximately $E/10$, rather than $E/100$ normally occurring in bulk materials, where E is the Young's Modulus.

Considerable difficulties are encountered in fabrication of whisker composites because of their extremely small size and the requirements of handling in such a manner that the high strength of the whiskers is maintained through processing and maximized in the composite material. Particular techniques of fabricating the composites which have been used with some success are diffusion bonding, powder metallurgy, liquid infiltration, plasma spraying, and electroforming, with composites of a eutectic composition, unidirectional solidification has been used to form composites. Examples of these techniques are described in Standifer, Recent Advances in Composite Technology, Z. Metallkunde, page 512 (1967). With composites having as a matrix material a thermoplastic material and as the reinforcing material a glass fiber, it has been possible to compression mold composites by squeezing a mix of the plastic and fiber to a desired shape in a mold under heat and pressure. Also, with the plastic and glass fiber materials, it has been possible to preheat the materials outside a die cavity and then force the materials into the die under high pressure to form a composite of a desired shape. For composites of refractory reinforcements and metallic matrix materials this method does not result in bonding of materials. Additionally, the matrix material may remain porous, and also the whisker material may be damaged.

With some prior art techniques the composite's strength is lost. Specifically, the reinforcing filaments or whiskers react with the matrix material forming an interphase which will not permit an effective transfer of a load or stress between the matrix and the filament or whisker. This interphase also serves as a stress concentration point causing premature fracture of the composite. In other instances voids develop around the reinforcing filaments due to change in the respective molar volumes.

This problem of bonding has been so acute that efforts have been directed to coating the filament or whisker with several layers of various materials to serve as bonding agents between the matrix and the filament or whisker.

The present invention provides a novel composite material and a novel method for manufacturing the material. The novel composition may be generally described as a composite which comprises a silicon matrix having embedded therein silicon carbide whiskers.

The method by which the above material may be prepared may be generally described as including the steps of admixing particulate silicon with silicon carbide whiskers in a mold, elevating the temperature of the mixture to a temperature slightly above the melting point of silicon and cooling the silicon and silicon carbide to thereby produce a composite of the two materials.

To be more specific, reference is made to the following examples which describe embodiments of the invention.

EXAMPLE I

A quartz vessel 10 cm. in length with an I.D. of 1 cm. and an O.D. of 1.2 cm. is heat sealed to close one end of the vessel. The vessel is then loaded with a mixture comprising 2 gms. of metallurgical grade particulate silicon and 2 gms. of silicon carbide whiskers which are approximately 1 to 10 microns in diameter and which vary between 100 and 200 microns in length. The tube is placed in a furnace having an inert atmosphere and the temperature of the mixture elevated to approximately 1411° C. or slightly above the melting point of silicon. The mixture is maintained at approximately 1411° C. for about 5 minutes following which the material is removed from the quartz vessel and found to have a composite tensile strength of $5 \times 10^5$ p.s.i.

EXAMPLE II

The procedure of Example I is repeated, except upon expiration of the 5 minute period during which the temperature of the silicon and silicon carbide mixture is maintained at 1411° C., the temperature of the quartz vessel is quickly elevated to about 1700° C. at which temperature the quartz vessel is drawn by applying a tensile force to one end of the quartz vessel reducing the outside diameter of the vessel to 4.5 mils. This drawing technique may be conveniently carried out in conventional quartz filament "drawing" equipment. The vessel and its contents are cooled and the quartz coating removed from the silicon and silicon carbide composite by etching with a hydrofluoric acid solution. The silicon and silicon carbide composite has an O.D. of 4 mils and will exhibit a composite tensile strength of approximately $7 \times 10^5$ p.s.i.

The test of Example II when repeated with a different weight ratio of silicon and silicon carbide produces composite materials having strengths which increase proportionally to the percent by weight of silicon carbide whiskers in the composite. For example, pure silicon has a composite tensile strength of approximately $2 \times 10^5$ p.s.i., a composite containing 25 weight percent silicon carbide whiskers has a composite strength of approximately $4.5 \times 10^5$ p.s.i. and a composite containing 75% silicon carbide whiskers will exhibit a tensile strength of approximately $9.0 \times 10^5$ p.s.i.

The "drawing" of the quartz vessel as detailed in Example II tends to align the silicon carbide whiskers thereby producing a composite having greater tensile strength than will be obtained with a composite cast as in Example I having random alignment of whiskers.

However, both the material formed by the procedure described in Example I and the material prepared in Example II exhibit much greater strength and have a higher Young's Modulus than silicon bodies having no reinforcing material. The silicon and silicon carbide composite may be used in applications requiring high temperature strength for load bearing members such as in turbine engine parts.

In the forming of the composite material of the present invention there is little reaction between the matrix and the whiskers because of the extremely low mutual solubility of the materials. The interphase and void problems encountered with prior art techniques are therefore avoided.

The lack of a significant reaction also results in retention of the whisker strength as part of the whisker is not consumed in a reaction with the matrix. There is, however, sufficient reaction between the matrix and the filament or whisker to provide the desired bonding and hence adequate stress transfer.

Also, there will be experienced relatively little thermal stress in fabrication or use of the composite material of the present invention due to the small difference between the thermal coefficient of silicon and silicon carbide.

The composite of silicon and silicon carbide is also less susceptible to oxidation than that of pure silicon because of the tendency of the silicon carbide to retain the silica layer.

While rather specific terms have been used to describe embodiments of the present invention, they are not intended, nor should they be construed as a limitation upon the invention.

I claim:
1. A process for preparing a silicon and silicon carbide composite material, which includes the steps of:
   admixing particulate silicon with silicon carbide whiskers in a quartz mold;
   elevating the temperature of the silicon and silicon carbide mixture to a temperature slightly above the melting point of silicon; and
   cooling the composite of silicon and silicon carbide.
2. The process of claim 1, wherein an elongated quartz vessel is used as the mold and after temperature of the silicon and silicon carbide mixture is elevated to a temperature slightly below the melting point of the quartz vessel and before cooling of the composite, there is included the step of:
   drawing the quartz vessel to reduce its diameter and thereby produce an elongated silicon and silicon carbide composite.
3. The process of claim 2 wherein the percentage by weight of the silicon and silicon carbide in the composite is about equal.
4. The process of claim 1, wherein the percentage by weight of the silicon and silicon carbide is about equal.

References Cited

UNITED STATES PATENTS

| | | | |
|---|---|---|---|
| 2,793,949 | 5/1957 | Imich | 75—201 |
| 3,047,383 | 7/1962 | Slayter | 75—201 |
| 3,282,658 | 11/1966 | Wainer. | |
| 3,337,337 | 8/1967 | Weeton et al. | 75—204 |
| 3,386,840 | 6/1968 | Gruber | 106—44 |

OTHER REFERENCES

Philip West (ed.), "Whisker Composites: Where Do They Stand Today?" appearing in June 1965 issue of Materials In Design Engineering, pages 112–116.

W. H. Sutton, "Whisker Composite Materials—A Prospectus for the Aerospace Designer," appearing in August 1966 issue of Astronautics & Aeronautics, pages 46–51.

JULIUS FROME, Primary Examiner

JOHN H. MILLER, Assistant Examiner

U.S. Cl. X.R.

23—208, 223; 29—182; 75—200, 204; 106—44; 264—60